US 11,883,943 B2

(12) United States Patent
Ho

(10) Patent No.: US 11,883,943 B2
(45) Date of Patent: Jan. 30, 2024

(54) ELECTRIC GARDENING MACHINE

(71) Applicant: Ping-Tzu Ho, Taichung (TW)

(72) Inventor: Ping-Tzu Ho, Taichung (TW)

( * ) Notice: Subject to any disclaimer, the term of this patent is extended or adjusted under 35 U.S.C. 154(b) by 525 days.

(21) Appl. No.: 17/030,878

(22) Filed: Sep. 24, 2020

(65) Prior Publication Data
US 2021/0101274 A1 Apr. 8, 2021

(30) Foreign Application Priority Data

Oct. 8, 2019 (TW) ................................ 108136433

(51) Int. Cl.
| | | |
|---|---|---|
| *B25F 5/02* | (2006.01) | |
| *A01D 34/416* | (2006.01) | |
| *A01D 101/00* | (2006.01) | |

(52) U.S. Cl.
CPC .............. *B25F 5/02* (2013.01); *A01D 34/416* (2013.01); *A01D 2101/00* (2013.01)

(58) Field of Classification Search
CPC .......... B25F 5/02; B25F 5/008; A01D 34/416; A01D 2101/00; A01D 34/68; A01D 34/6818; A01D 34/78; A01D 69/02
See application file for complete search history.

(56) References Cited

U.S. PATENT DOCUMENTS

| | | | | |
|---|---|---|---|---|
| 6,181,032 | B1* | 1/2001 | Marshall ............... | H01M 50/20 200/321 |
| 9,991,825 | B1* | 6/2018 | Ackerman ............... | H02P 7/06 |
| 10,279,461 | B2* | 5/2019 | Miaowu ................. | A01G 20/43 |
| 11,485,003 | B2* | 11/2022 | McCue .................... | B25F 5/02 |
| 2008/0106159 | A1* | 5/2008 | Yoshida ................ | A01G 3/088 310/64 |
| 2012/0210585 | A1* | 8/2012 | Gieske ............... | B27B 17/0008 30/296.1 |
| 2014/0151079 | A1* | 6/2014 | Furui ....................... | B25F 5/00 173/171 |
| 2014/0154535 | A1* | 6/2014 | Olsson ............... | H01M 10/613 429/53 |
| 2015/0306719 | A1* | 10/2015 | Weiss ................... | B23Q 11/126 165/80.4 |

(Continued)

FOREIGN PATENT DOCUMENTS

TW        I659685 B     5/2019

*Primary Examiner* — Thomas M Wittenschlaeger
*Assistant Examiner* — Katie L Gerth
(74) *Attorney, Agent, or Firm* — MUNCY, GEISSLER, OLDS & LOWE, P.C.

(57) ABSTRACT

An electric gardening machine includes a rod portion, including a machine tool head; an operation portion, disposed on the rod portion, including a first assembling portion having a first electrical terminal and a pressing member; and a controlling portion, including a shell body having a second assembling portion detachably assembled with the first assembling portion and a control module disposed in the shell body, a second electrical terminal of the control module being in electrical contact with the first electrical terminal, the control module being switchable by the pressing member to supply power to the machine tool head; wherein the shell body includes a first shell member and a second shell member connected with each other, the second electrical terminal is disposed through the first shell member, and the second assembling portion is disposed on the first shell member.

9 Claims, 4 Drawing Sheets

(56) References Cited

U.S. PATENT DOCUMENTS

| | | | |
|---|---|---|---|
| 2015/0375416 A1* | 12/2015 | Haneda | B27B 17/00 30/383 |
| 2016/0227694 A1* | 8/2016 | Bermudez | A01D 42/00 |
| 2017/0202137 A1* | 7/2017 | Momiyama | B25F 5/02 |
| 2017/0273239 A1* | 9/2017 | Ota | A01D 34/68 |
| 2018/0040927 A1* | 2/2018 | Rejman | H01M 10/482 |
| 2018/0099398 A1* | 4/2018 | Bergquist | B25F 5/008 |
| 2018/0104809 A1* | 4/2018 | Dyer | B27B 17/0016 |
| 2018/0130980 A1* | 5/2018 | Ogura | H01M 10/482 |
| 2018/0131058 A1* | 5/2018 | Wang | H01M 50/213 |
| 2018/0178366 A1* | 6/2018 | Matei | B25B 21/00 |
| 2018/0200872 A1* | 7/2018 | Leong | B25B 21/002 |
| 2018/0337540 A1* | 11/2018 | Taga | H02J 7/0013 |
| 2018/0361555 A1* | 12/2018 | Miaowu | B25F 3/00 |
| 2023/0189727 A1* | 6/2023 | Mandel | F04D 25/0673 15/405 |

\* cited by examiner

ELECTRIC GARDENING MACHINE

BACKGROUND OF THE INVENTION

Field of the Invention

The present invention relates to an electric gardening machine.

Description of the Prior Art

Generally, in order to save manpower, the electric garden machine will be used for mowing or turning the soil. The user can hold the electric garden machine and use the machine tool head of the electric garden machine to mow the grass or for soil turning operations. This type of the electric gardening machine is disclosed in TWI659685. The electric gardening machine has a machine tool head, a controlling portion and a rod portion connected between the machine tool head and the controlling portion. In use, a pressing member of the controlling portion is pressed by a hand of an operator to control the operation of the machine tool head, and the other hand of the operator grips on the handle of the rod portion so that the handle serves as a lever fulcrum for lifting the machine tool head. The machine tool head is driven by an electric motor. In order to control the rotation mode of the electric motor, a control module (such as a microprocessor) needs to be electrically connected to the electric motor to control rotation speed, rotation interval time or torque of the electric motor according to the parameters preset in the control module.

The conventional control module is not detachably received in the controlling portion so that when the electric gardening machine is not used and placed in the warehouse, the control module is easily damaged by humidity and high temperature of the warehouse. In addition, when the controlling portion is damaged and needs to be repaired, the entire electric gardening machine must be carried to the repair center for repair. However, the volume and weight of the entire electric gardening machine are too large, which is inconvenient.

The present invention is, therefore, arisen to obviate or at least mitigate the above-mentioned disadvantages.

SUMMARY OF THE INVENTION

The main object of the present invention is to provide an electric gardening machine which includes a detachable controlling portion for easy detachment, repair and storage.

To achieve the above and other objects, an electric gardening machine is provided, including: a rod portion, including a machine tool head; an operation portion, disposed on the rod portion, the operation portion including a first assembling portion and a pressing member, the first assembling portion including a first electrical terminal; and a controlling portion, including a shell body and a control module, the control module disposed in the shell body, the shell body including a second assembling portion, the second assembling portion being detachably assembled with the first assembling portion so that a second electrical terminal of the control module is in electrical contact with the first electrical terminal, the control module being configured to control rotation speed and rotation mode of the machine tool head according to default parameters thereof, the control module being switchable by the pressing member to supply power to the machine tool head; wherein the shell body includes a first shell member and a second shell member connected with each other, the second electrical terminal is disposed through the first shell member, and the second assembling portion is disposed on the first shell member.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
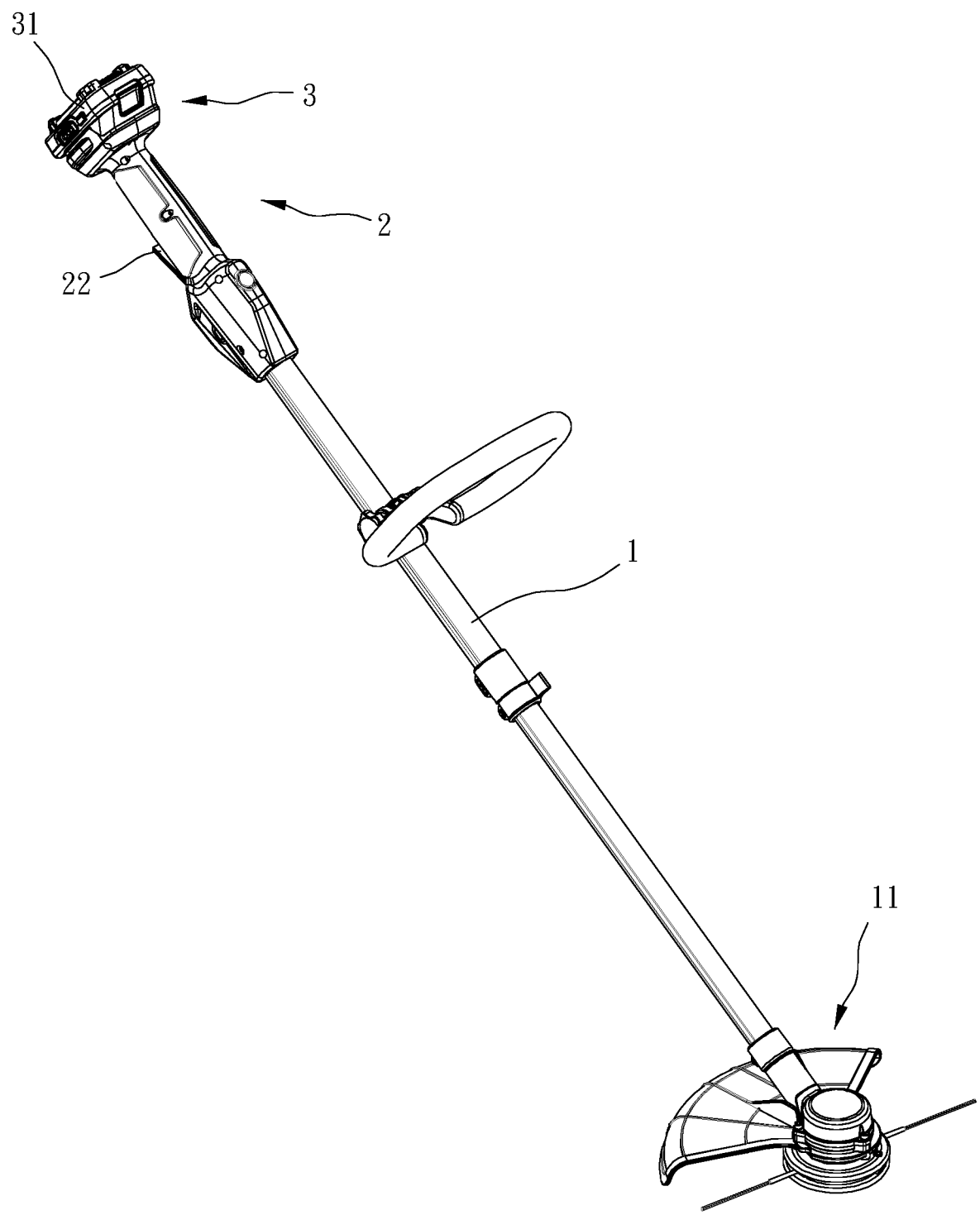
FIG. 1 is a stereogram of a preferable embodiment of the present invention.
Figure 2:
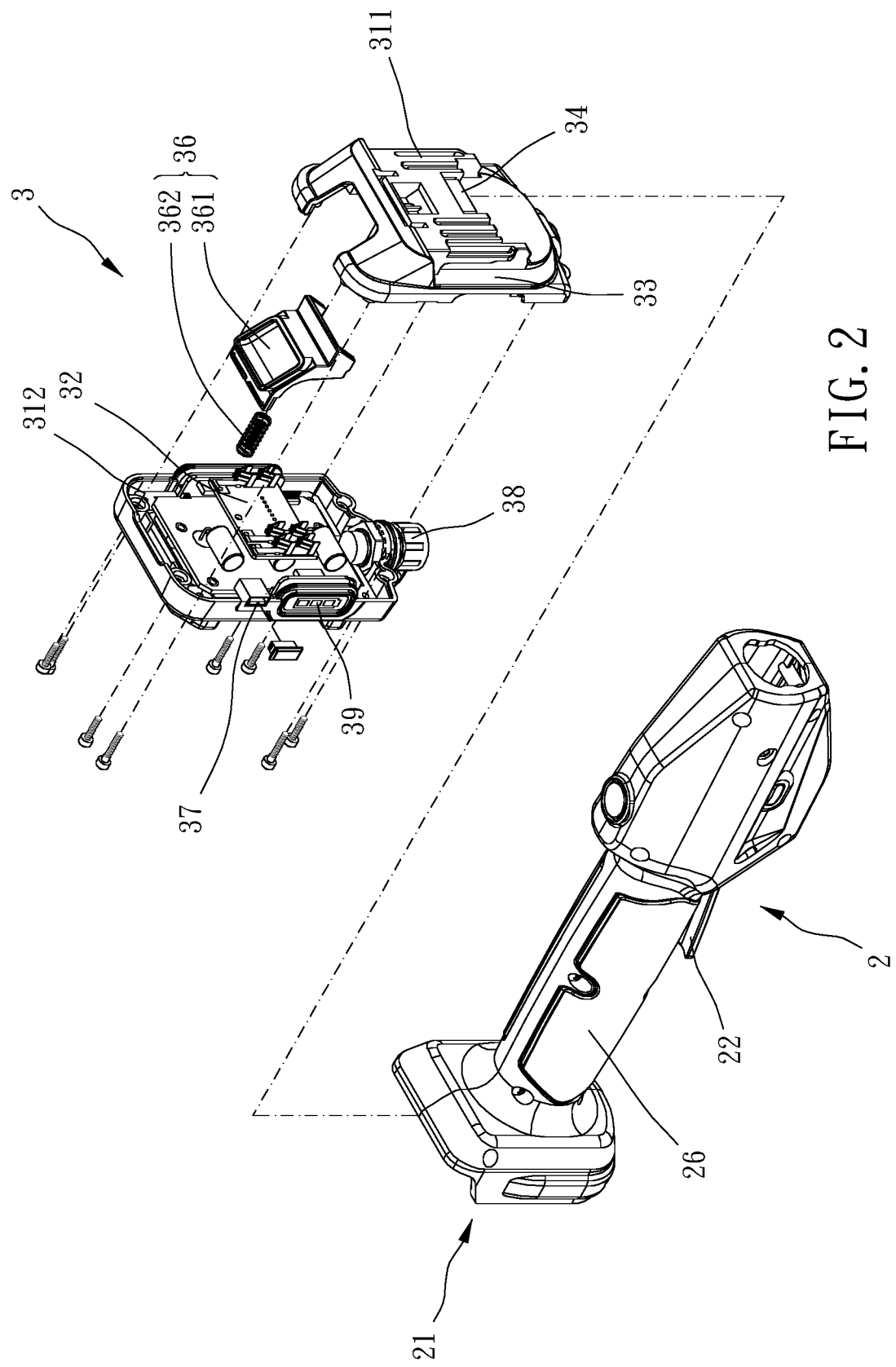
FIGS. 2 and 3 are breakdown drawings of a preferable embodiment of the present invention.
Figure 3:
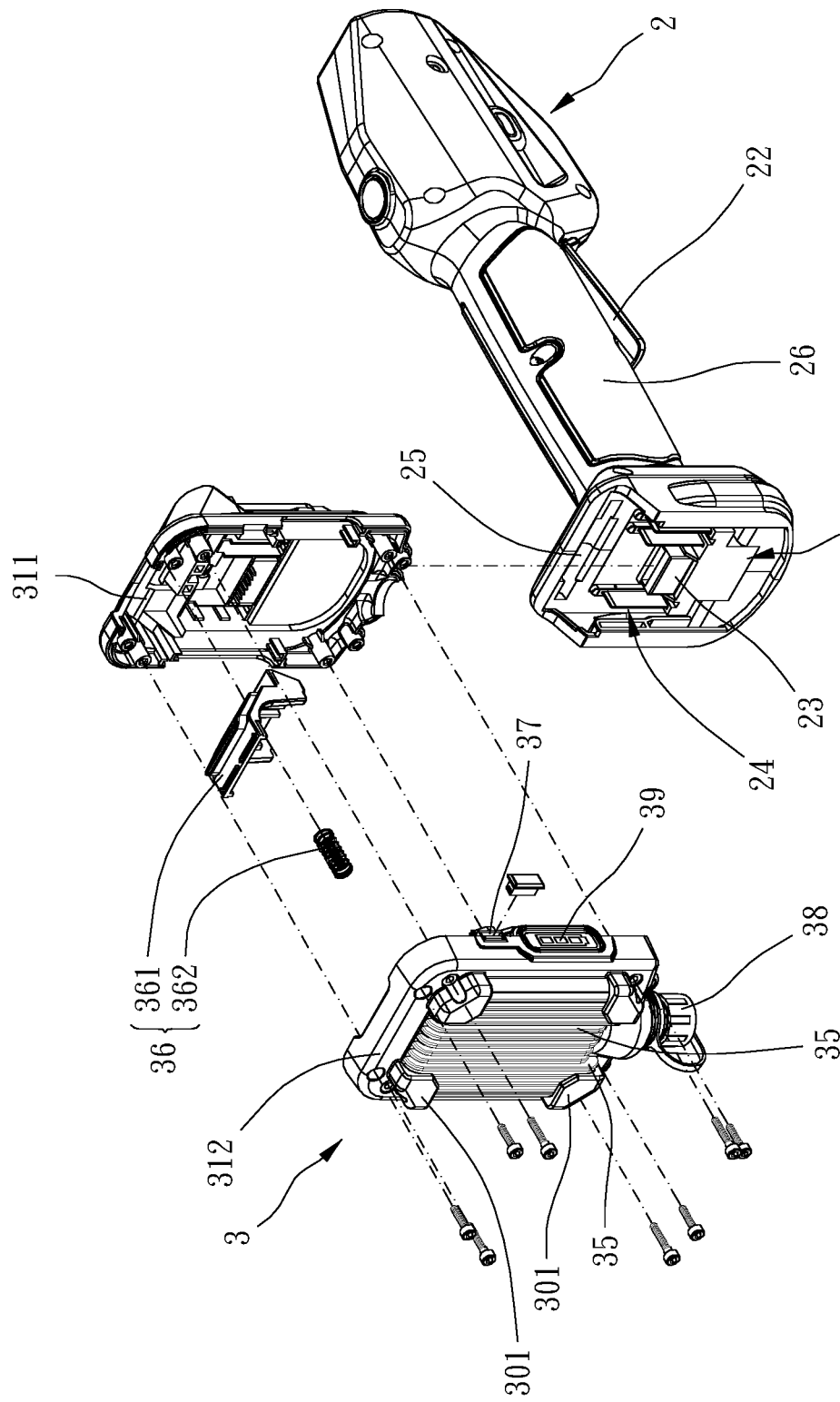
Figure 4:
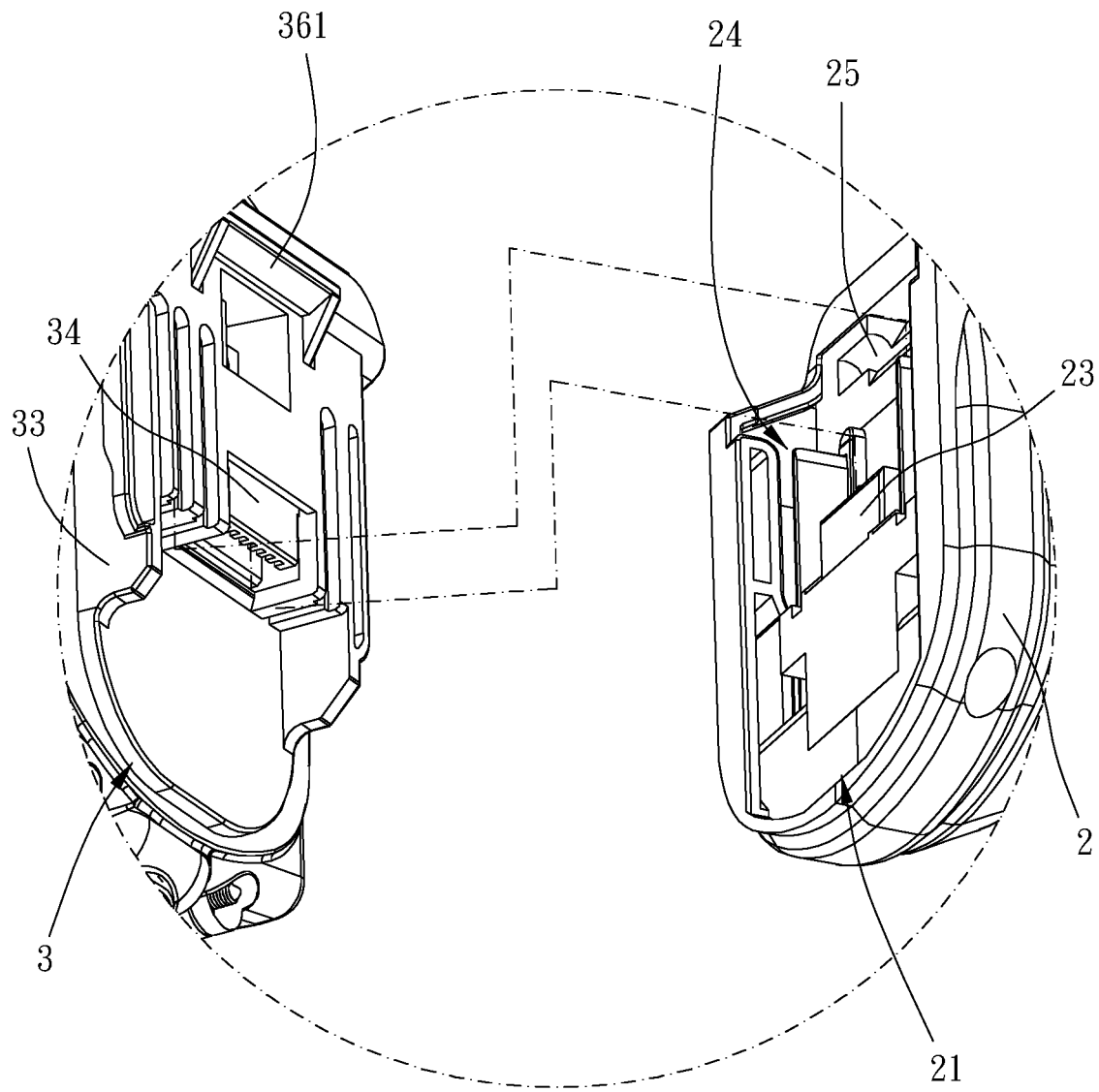
FIG. 4 is a partial enlargement of a preferable embodiment of the present invention.

Please refer to FIGS. 1 to 4 for a preferable embodiment of the present invention. An electric gardening machine 1 of the present invention includes a rod portion 1, an operation portion 2 and a controlling portion 3.

The rod portion 1 includes a machine tool head 11. In this embodiment, the machine tool head 11 is a machine tool head of a lawn mower; however, the machine tool head may be a machine tool head of a tipper or hole drilling machine.

The operation portion 2 is disposed on the rod portion 1, the operation portion 2 includes a first assembling portion 21 and a pressing member 22, and the first assembling portion 21 includes a first electrical terminal 23. In this embodiment, the operation portion 2 includes a grip 26 which is cylindrical, and the pressing member 22 is disposed on a side of the grip 26. The operation portion 2 is disposed around an end of the rod portion 1 away from the machine tool head 11.

The controlling portion 3 includes a shell body 31 and a control module 32, the control module 32 is disposed in the shell body 31, the shell body 31 includes a second assembling portion 33, and the second assembling portion 33 is detachably assembled with the first assembling portion 21 so that a second electrical terminal 34 of the control module 32 is in electrical contact with the first electrical terminal 23. The control module 32 is configured to control rotation speed and rotation mode of the machine tool head 11. The controlling portion 3 may be detachably and optionally equipped to any of operation portions of various gardening machines, thus saving cost for purchasing control modules. The control module 32 is switchable by the pressing member 22 to supply power to the machine tool head 11. Since the controlling portion 3 is detachably attached to the operation portion 2, the controlling portion 3 can be optionally detached from the gardening machine or separately stored without accompanying with the gardening machine, thus preventing the control module 32 of the controlling portion 3 from damage caused by humidity and high temperature of the environment. Additionally, when the control module 32 malfunction, only the controlling portion 3 should be sent for repair.

Specifically, one of the first assembling portion 21 and the second assembling portion 33 includes a groove 24, and the other of the first assembling portion 21 and the second assembling portion 33 is slidably received within the groove 24. In this embodiment, the first assembling portion 21 includes the groove 24, and the second assembling portion 33 is slidably received within the groove 24 so that the first assembling portion 21 and the second assembling portion 33 can be well correspondingly positioned.

Preferably, the shell body 31 includes a first shell member 311 and a second shell member 312, the second electrical terminal 34 is disposed through the first shell member 311, and the second assembling portion 33 is disposed on the first shell member 311. In this embodiment, the second assembling portion 33 is formed as two side frame portions of the second shell member 312 received within the groove 24.

The groove 24 is disposed at an end of the operation portion 2 away from the machine tool head 11, which can make the center of gravity of the gardening machine close to its central portion. A side of the second shell member 312 away from the first shell member 311 includes a plurality of cooling fins 35, for dissipating heat from the controlling portion 3. Specifically, the rod portion 1 is inserted axially in the operation portion 2, the rod portion 1, the operation portion 2 and the controlling portion 3 are arranged in a line, and the rod portion 1 is directed toward the controlling portion 3. The shell body 31 further includes a plurality of bumps 301, each of the plurality of bumps 301 is higher than and protrusive beyond the plurality of cooling fins 35, and part of the plurality of cooling fins 35 is connected to and between two of the plurality of bumps 301.

Specifically, one of the first assembling portion 21 and the second assembling portion 33 includes an engagement unit 36, the other of the first assembling portion 21 and the second assembling portion 33 includes an engagement hole 25, and the engagement unit 36 is engaged within the engagement hole 25, thus preventing disengagement of the first assembling portion 21 and the second assembling portion 33.

In this embodiment, the engagement hole 25 is disposed on the operation portion 2, and the engagement unit 36 is disposed on the shell body 31 and includes an engagement member 361 and an elastic member 362. The elastic member 362 is disposed between the shell body 31 and the engagement member 361 and bias the engagement member 361 in a direction toward the engagement hole 25. To detach the controlling portion 3, it needs only to press to the engagement member 361 to disengage the engagement member 361 and the engagement hole 25.

The controlling portion 3 further includes a data input unit 37, and the data input unit 37 is disposed on the shell body 31 and connected with the control module 32. The data input unit 37 is configured to be connected to an external data storage device so that the control module 32 is configured to be communicable with the external data storage device. In this embodiment, the data input unit 37 includes a Universal Serial Bus (USB) Port, and the data storage device may be a computer testing equipment. Through communication of the data storage device and the control module 32, it can proceed to set parameters of the control module 32 or to repair the control module 32.

The shell body 31 further includes a power input unit 38, and the power input unit 38 is electrically connected with the control module 32 and configured to be connected to an external power supply. The external power supply may be, but not limited to, a lithium battery or lead-acid battery, or a socket.

Preferably, two indicator lights 39 are respectively disposed on two sides of the shell body 31, one of the two indicator lights 39 is configured to show the rotation mode of the machine tool head 11, and the other of the two indicator lights 39 is configured to show the power volume of the external power supply.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An electric gardening machine, including:
    a rod portion, including a machine tool head;
    an operation portion, disposed on the rod portion, the operation portion including a first assembling portion and a pressing member, the first assembling portion including a first electrical terminal; and
    a controlling portion, including a shell body and a control module, the control module disposed in the shell body, the shell body including a second assembling portion, the second assembling portion being detachably assembled with the first assembling portion so that a second electrical terminal of the control module is in electrical contact with the first electrical terminal, the control module being configured to control rotation speed and rotation mode of the machine tool head according default parameters thereof, the control module being switchable by the pressing member to supply power to the machine tool head;
    wherein the shell body includes a first shell member and a second shell member connected with each other, the second electrical terminal is disposed through the first shell member, and the second assembling portion is disposed on the first shell member;
    wherein the rod portion is inserted axially in the operation portion, the rod portion, the operation portion and the controlling portion are arranged in a line, and the rod portion is directed toward the controlling portion;
    wherein the shell body further includes a plurality of cooling fins and four bumps at four corners of the shell body, each of the four bumps is higher than and protrusive beyond the plurality of cooling fins, ends of part of the plurality of cooling fins are directly connected to and between two of the four bumps, ends of another part of the cooling fins are directly connected to and between the other two of the four bumps, and ends of the rest of the cooling fins are parallel to and located between sides of the two of the four bumps, and are parallel to and located between sides of the other two of the four bumps.

2. The electric gardening machine of claim 1, wherein one of the first assembling portion and the second assembling portion includes a groove, and the other of the first assembling portion and the second assembling portion is slidably received within the groove.

3. The electric gardening machine of claim 2, wherein the groove is disposed at an end of the operation portion away from the machine tool head, and a side of the second shell member away from the first shell member includes the cooling fins.

4. The electric gardening machine of claim 3, wherein the shell body further includes a power input unit, and the power input unit is electrically connected with the control module configured to be connected to an external power supply; two indicator lights are respectively disposed on two sides of the shell body, one of the two indicator lights is configured to show the rotation mode of the machine tool head controlled by the control module, and the other of the two indicator lights is configured to show the power volume of the external power supply; the operation portion is disposed around an end of the rod portion away from the machine tool head; one of the first assembling portion and the second assembling portion includes an engagement unit, the other of the first assembling portion and the second assembling portion includes an engagement hole, and the engagement unit is engaged within the engagement hole; the engagement hole is disposed on the operation portion, the engagement unit is disposed on the shell body and includes an engagement member and an elastic member, the elastic member is disposed between the shell body and the engagement member and bias the engagement member in a direction toward the engagement hole; the controlling portion further includes a data input unit, the data input unit is disposed on the shell body and connected with the control module, and the data input unit is configured to be connected to an external data storage device so that the control module is configured to be communicable with the external data storage device; and the operation portion includes a grip which is cylindrical, and the pressing member is disposed on a side of the grip.

5. The electric gardening machine of claim 1, wherein one of the first assembling portion and the second assembling portion includes an engagement unit, the other of the first assembling portion and the second assembling portion includes an engagement hole, and the engagement unit is engaged within the engagement hole.

6. The electric gardening machine of claim 5, wherein the engagement hole is disposed on the operation portion, the engagement unit is disposed on the shell body and includes an engagement member and an elastic member, the elastic member is disposed between the shell body and the engagement member and bias the engagement member in a direction toward the engagement hole.

7. The electric gardening machine of claim 1, wherein the controlling portion further includes a data input unit, the data input unit is disposed on the shell body and connected with the control module, and the data input unit is configured to be connected to an external data storage device so that the control module is configured to be communicable with the external data storage device.

8. The electric gardening machine of claim 1, wherein the operation portion includes a grip which is cylindrical, and the pressing member is disposed on a side of the grip.

9. The electric gardening machine of claim 1, wherein the shell body further includes a power input unit, and the power input unit is electrically connected with the control module and configured to be connected to an external power supply.

* * * * *